May 27, 1969    A. L. GOOD    3,447,116
PRESSURE OR TEMPERATURE REGULATOR
Filed Dec. 6, 1966    Sheet 1 of 8

INVENTOR.
ARTHUR L. GOOD
BY
Cauder & Cauder
HIS ATTORNEYS

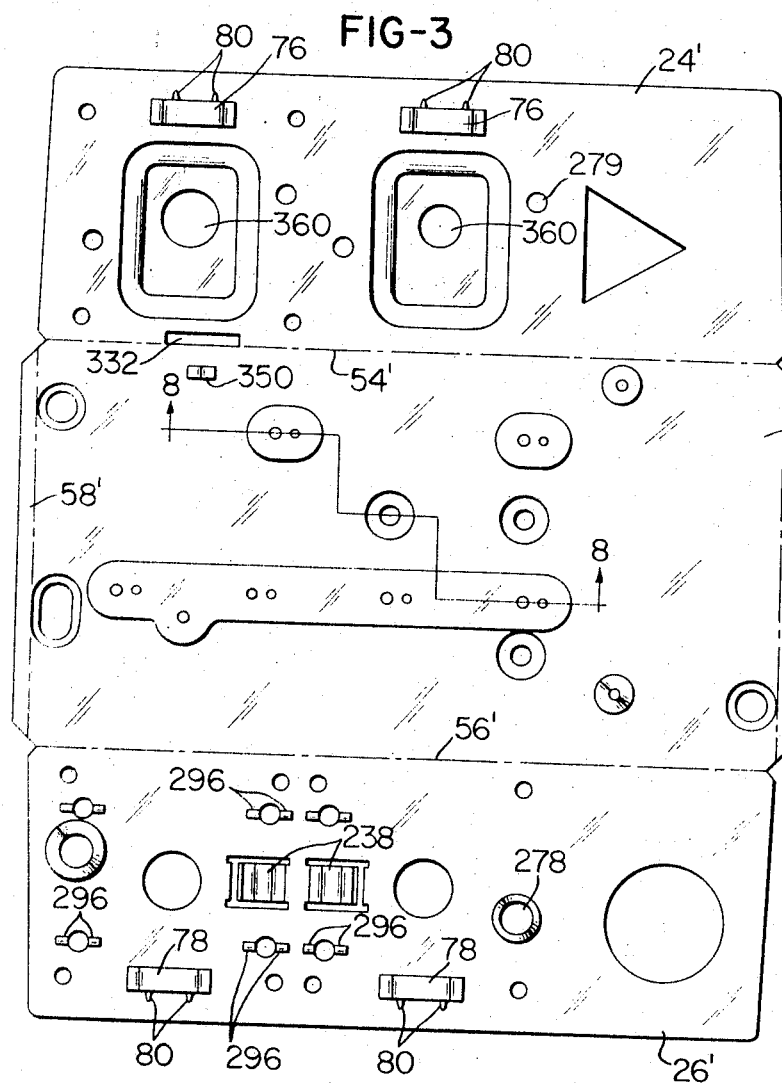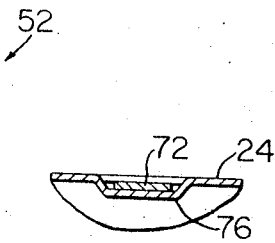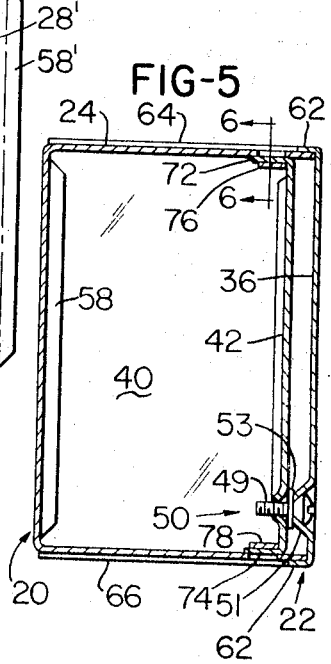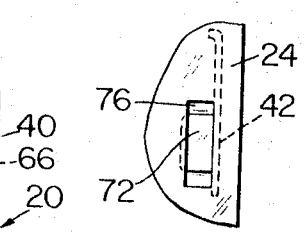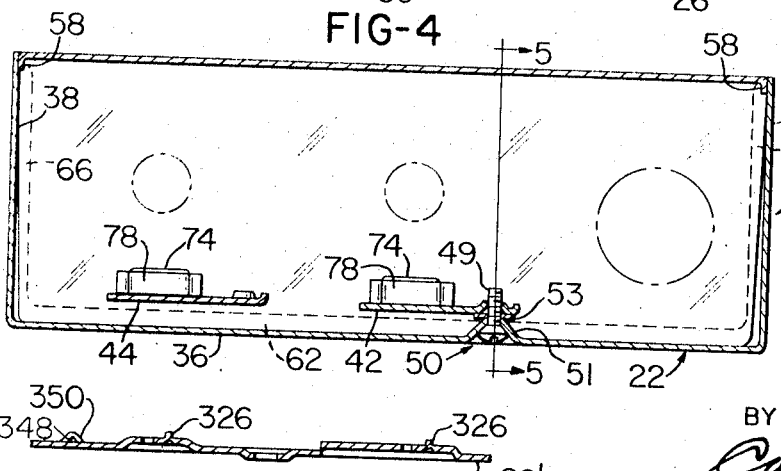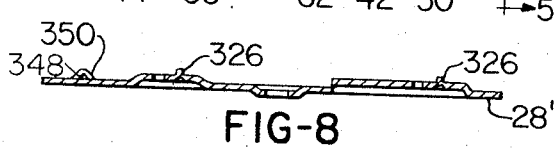

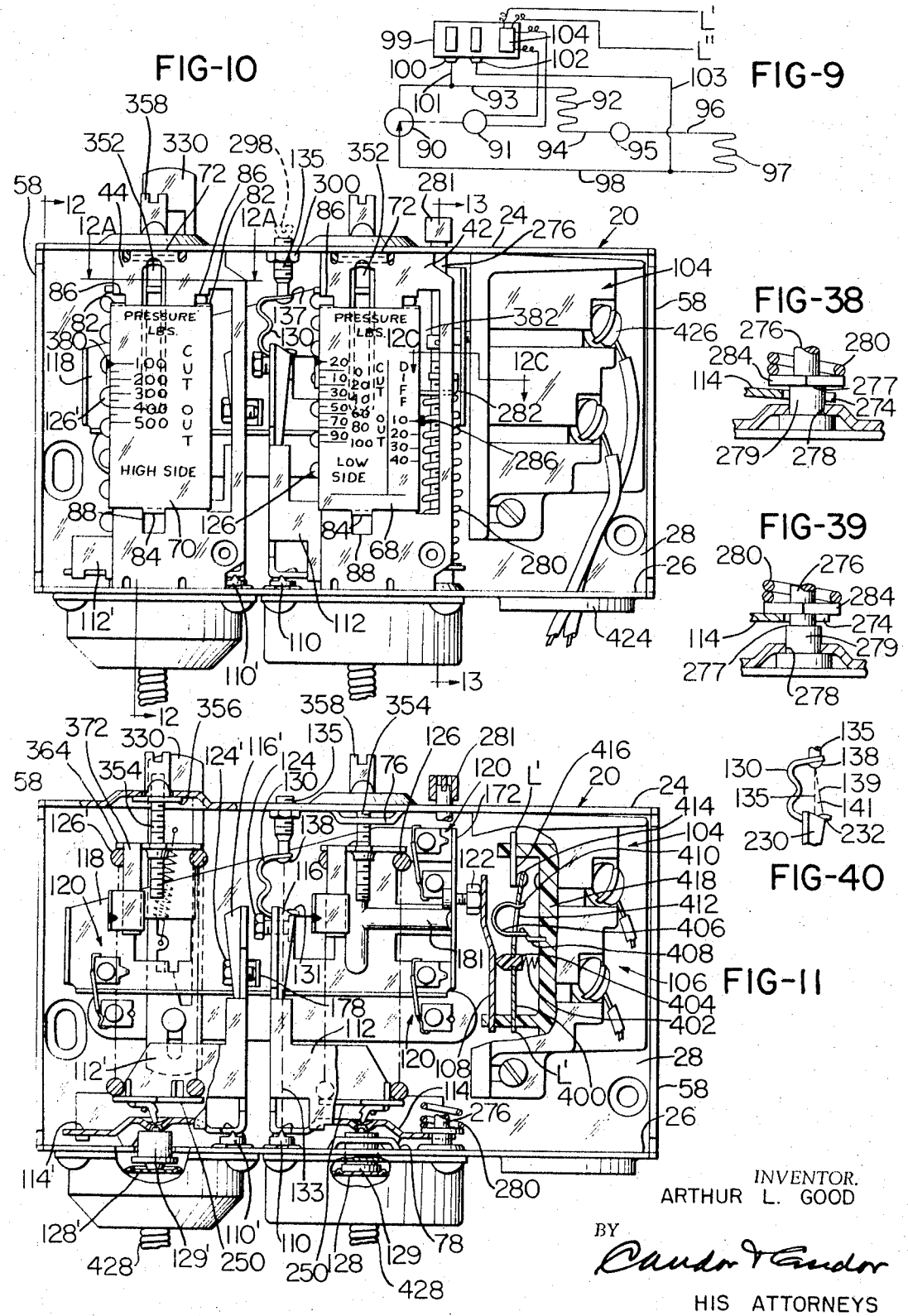

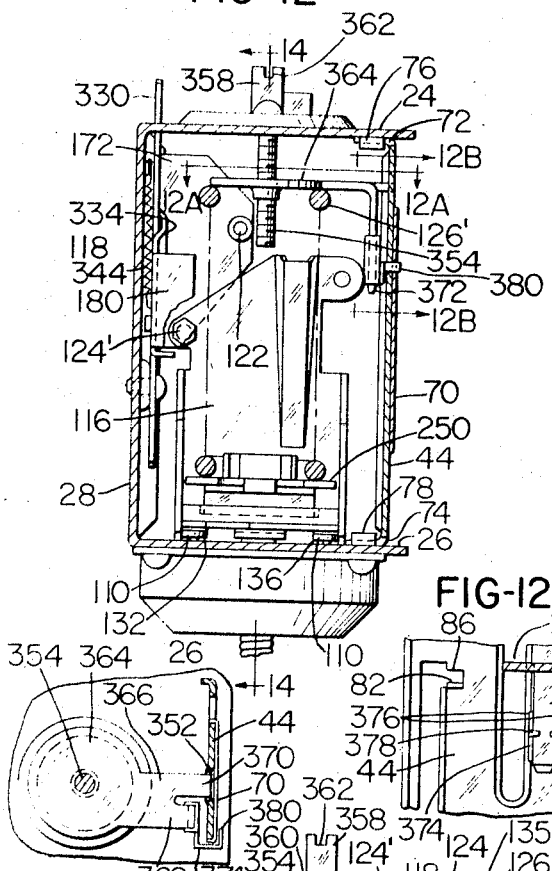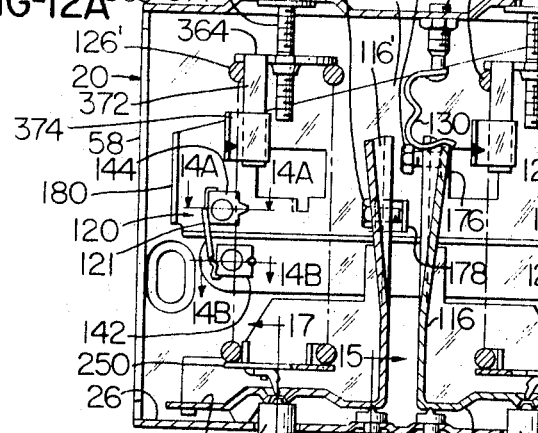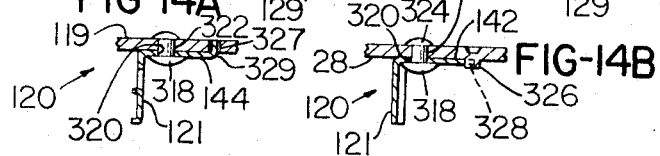

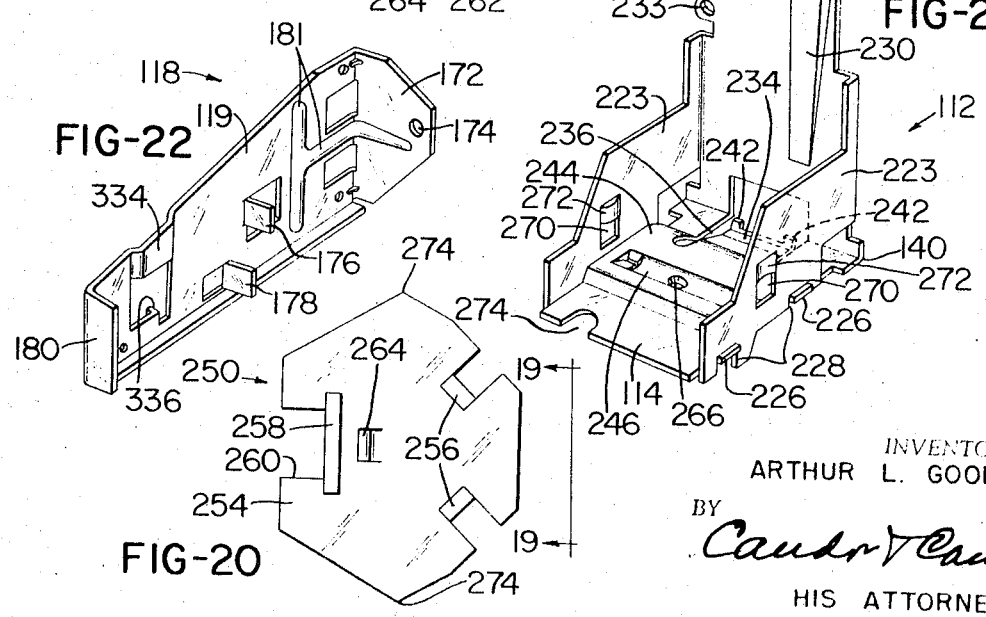

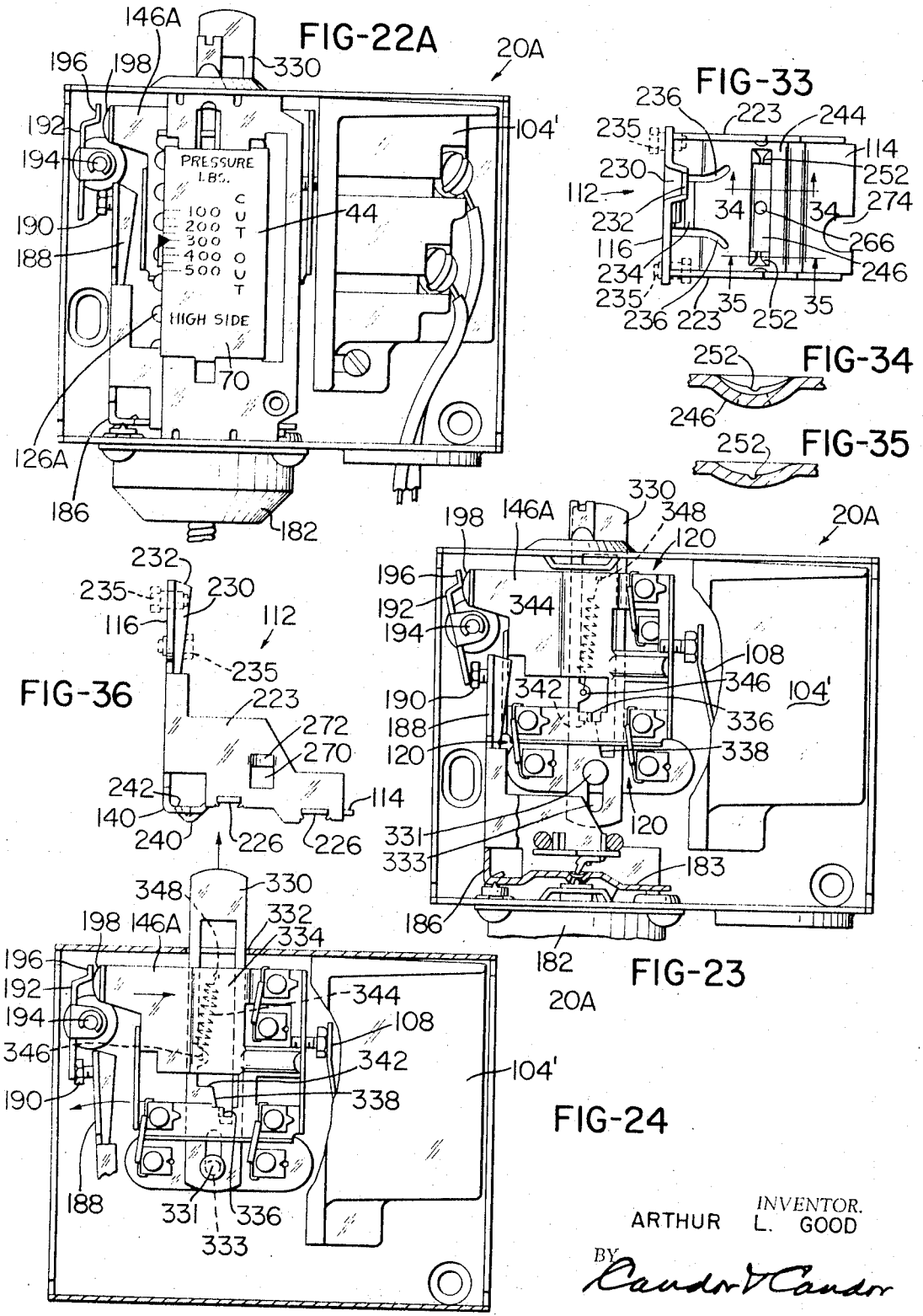

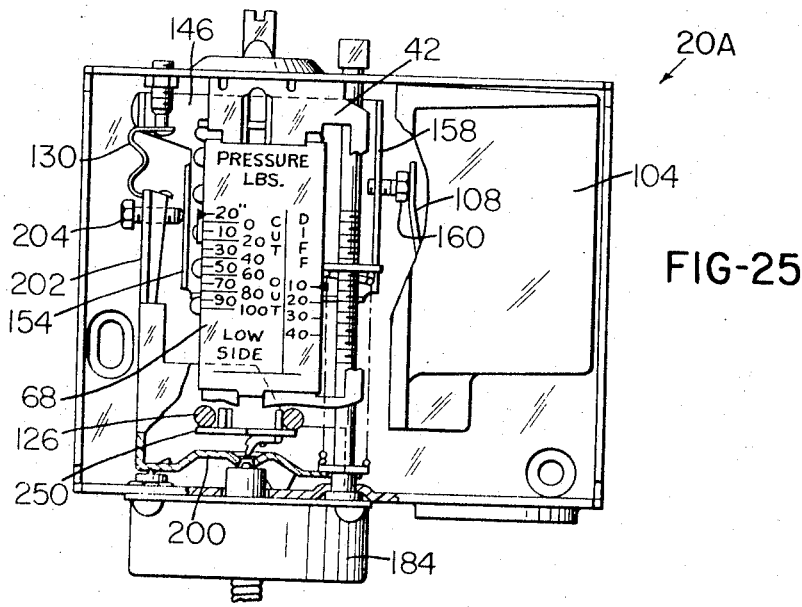
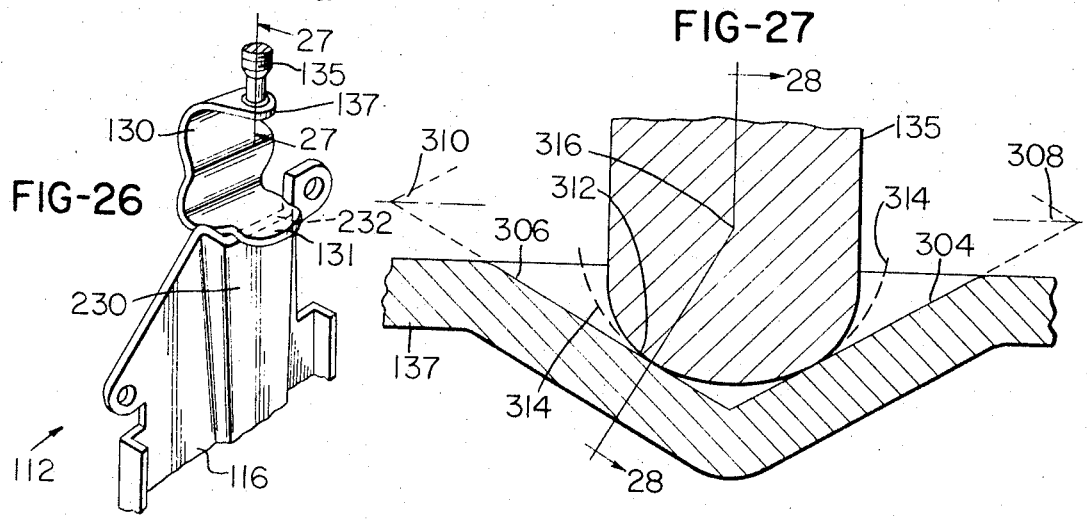
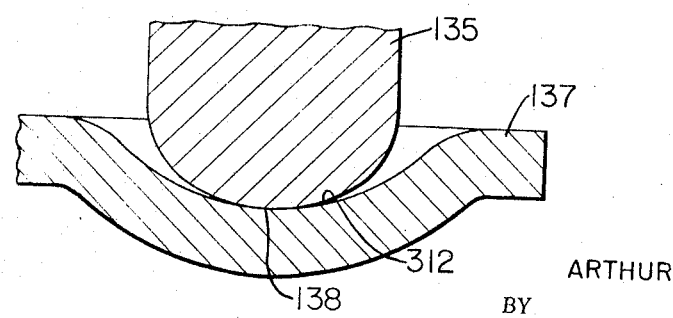

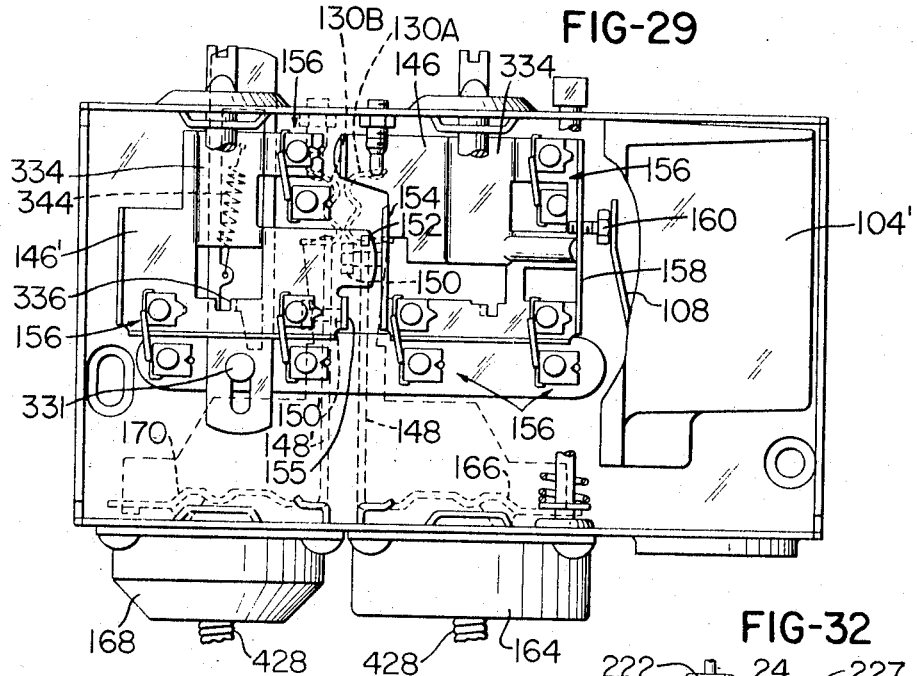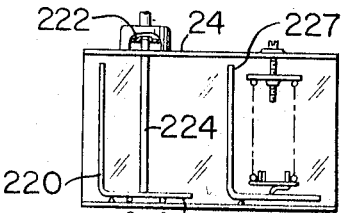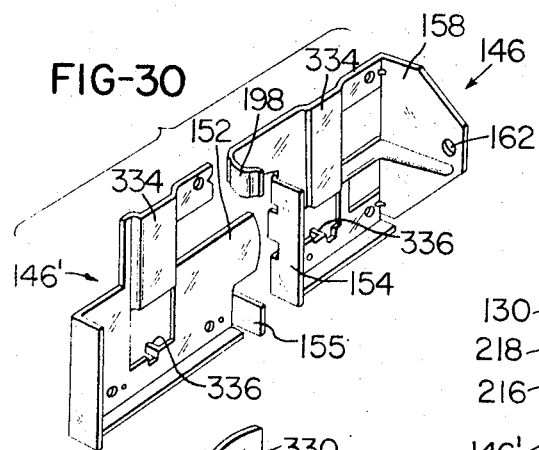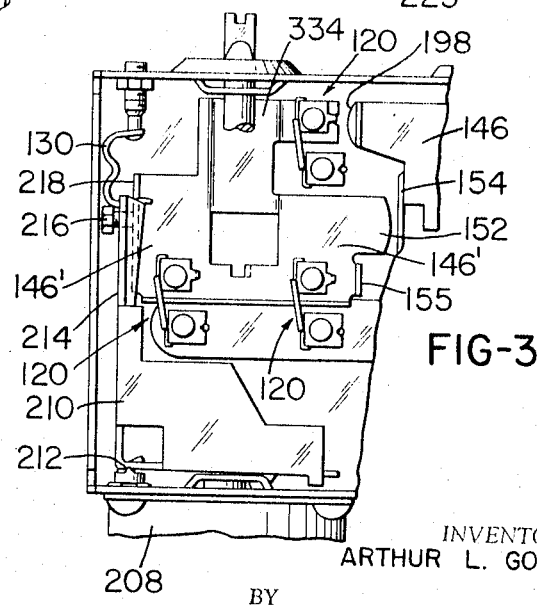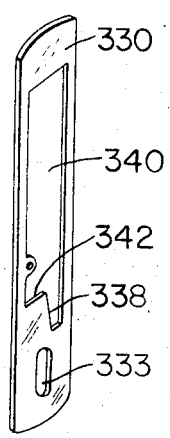

United States Patent Office 3,447,116
Patented May 27, 1969

3,447,116
PRESSURE OR TEMPERATURE REGULATOR
Arthur L. Good, Elkhart, Ind., assignor to Robertshaw Controls Company, Richmond, Va., a corporation of Delaware
Filed Dec. 6, 1966, Ser. No. 599,515
Int. Cl. H01h *37/32, 37/36*
U.S. Cl. 337—327                25 Claims

ABSTRACT OF THE DISCLOSURE

A regulator may be responsive to pressure and/or temperatures produced by the operation of a refrigeration system. The regulator has a support frame capable of receiving any of a plurality of components to produce a variety of regulators. The frame may have a telescoping cover. The components include an L-shaped rocker arm having a vertical arm lever and a horizontal arm lever. The vertical arm lever actuates a shuttle which, in turn, actuates a snap switch. A negating spring downwardly presses an upper part of the vertical arm lever at a varying slight angle to negative the spring rate of the range spring which downwardly pushes on the horizontal arm lever. Such negation is in accordance with the sine of the slight angle.

---

This invention relates to a pressure or temperature regulator, for example, to a regulator of pressure or temperature conditions produced by the operation of a refrigerating system and the like.

A feature of this invention includes a type of support frame capable of receiving any of a plurality of components to produce a large variety of regulators which may be tailored to regulate refrigerating systems and the like in many different arrangements, as desired by many different refrigeration system manufacturers, users and the like.

Another feature of this invention includes a type of support frame which may be constructed in a relatively few similar embodiments, each embodiment being capable of receiving many of the previously described components so that the invention is efficiently adaptable to even more diversified constructions of pressure and temperature regulators.

Another feature of this invention includes a support frame that may be combined with a cover that is easily and efficiently secured to and removed from the support frame in a manner safely to protect the assembled components while the cover is secured to the frame and to permit efficient assembly, service and repair when the cover is not secured to the frame.

This invention also includes many components that may be used in making regulators, such as the regulators of this invention. Details of such components are more fully apparent as the disclosure proceeds.

Other features of this invention are apparent from this description, the appended claims subject matter, and/or the accompanying drawings in which:

FIGURE 3 is a plan view of a flat blank which may be bent to form the frame of FIGURE 1.

FIGURE 4 shows the frame of FIGURE 1 telescoped with the cover of FIGURE 2 without any components having been applied to the frame except an indicator bracket and a cover securing screw to be described.

FIGURE 5 is a vertical cross section taken substantially along the line 5—5 of FIGURE 4.

FIGURE 6 is a detail cross section taken along the line 6—6 of FIGURE 5.

FIGURE 7 is a top plan view of a portion of FIGURE 5.

FIGURE 8 is a cross section along line 8—8 of FIGURE 3.

FIGURE 9 is a diagrammatic view of a typical refrigeration system which may be regulated by a regulator of this invention.

FIGURE 10 is a front view of the support frame of FIGURE 1 with suitable components installed therein, and with the cover of FIGURE 2 omitted.

FIGURE 11 is a view similar to FIGURE 10 with certain parts omitted and other parts shown in cross section.

FIGURE 12 is a cross section taken generally along the line 12—12 of FIGURE 10.

FIGURE 12A is a cross section along the line 12A—12A of FIGURES 10 and 12.

FIGURE 12B is a cross section along the line 12B—12B of FIGURE 12.

FIGURE 12C is a cross section along the line 12C—12C of FIGURES 10 and 13.

FIGURE 12D is a cross section along the line 12D—12D of FIGURE 13.

FIGURE 13 is a cross section taken generally along the line 13—13 of FIGURE 10.

FIGURE 14 is a cross section taken generally along a plane perpendicular to FIGURE 12 and along the line 14—14 of FIGURE 12 but with certain parts taken outside said plane, for a more detailed showing of the parts.

FIGURE 14A is a cross section along line 14A—14A of FIGURES 14 and 13.

FIGURE 14B is a cross section along the line 14B—14B of FIGURES 14 and 13.

FIGURE 15 is an enlarged cross section of the universal fulcrum construction taken generally along the line 15—15 of FIGURE 14.

FIGURE 16 is a cross section along the line 16—16 of FIGURE 15.

FIGURE 17 is an enlarged cross section taken generally along line 17—17 of FIGURE 14.

FIGURE 18 is a cross section taken along line 18—18 of FIGURE 17.

FIGURE 19 is an elevation of the receiver of the lower end of the compression spring.

FIGURE 20 is a top view of FIGURE 19.

FIGURE 21 is a perspective view of the rocker arm.

FIGURE 22 is a perspective view of the large single shuttle means or plate.

FIGURE 22A is a front view of another embodiment of the invention using a single rocker arm and a reverse action lever to move the shuttle means, and with the bellows to be connected to the high side of the refrigeration system.

FIGURE 23 is a partly cross section view similar to FIGURE 22A and showing the rocker arm and shuttle in low pressure condition.

FIGURE 24 is a view similar to FIGURE 23 with the rocker arm and shuttle in high pressure condition.

FIGURE 25 is a view similar to FIGURE 23, but showing the bellows to be connected to the low side of the refrigeration system and with a negating spring replacing the reversing lever.

FIGURE 26 is a perspective view of the negating spring and its environment.

FIGURE 27 is an enlarged cross section taken substantially along line 27—27 of FIGURE 26.

FIGURE 28 is a cross section along line 28—28 of FIGURE 27.

FIGURE 29 is a view somewhat similar to FIGURE 11 but showing the two small shuttle plates of FIGURE 30 instead of the single large shuttle plate of FIGURE 22.

FIGURE 30 is a perspective of the two small shuttle plates which can replace the single large shuttle plate of FIGURE 22.

FIGURE 31 is a view of a double bellows embodiment in which the left bellows may be connected to the low side of a refrigeration system and a negative spring may be applied to the vertical lever.

FIGURE 32 is a diagrammatic view showing a switch with a rocker arm actuated by a bellows or diaphragm from the top wall.

FIGURE 33 is a top view of the rocker arm with possible screw positions shown.

FIGURE 34 is a partial cross section along line 34 of FIGURE 33.

FIGURE 35 is a partial cross section along the line 35 of FIGURE 33.

FIGURE 36 is a side elevation of the rocker arm from the right side of FIGURE 33.

FIGURE 37 is a perspective view of the resetting member.

FIGURE 38 is a diagrammatic view showing the "cut in" position of the horizontal lever and the lower end of the differential spring of FIGURES 10–14.

FIGURE 39 is a view similar to FIGURE 38, but showing the "cutout" position of such horizontal lever and spring.

FIGURE 40 is a detail view of the negating spring angle.

Figure 1:
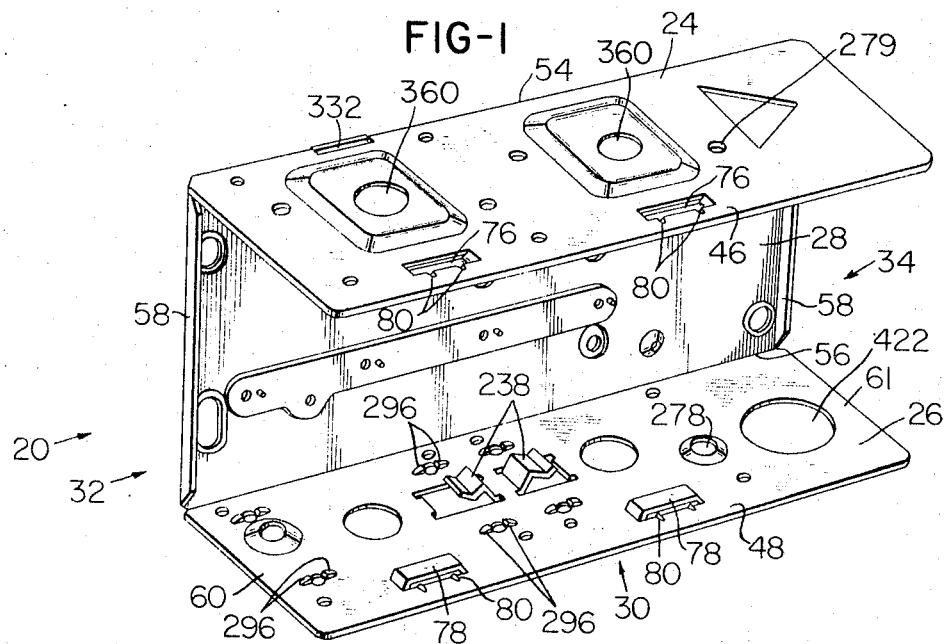
FIGURE 1 is a front perspective view of one embodiment of a support frame in readiness to receive the desired selected components to be assembled on such frame.

Certain words may be used in this specification and in the claimed subject matter that indicate direction, relative position, and the like. Such words are used for the sake of clearness and brevity. However, it is to be understood that such words are used only in connection with illustrations in the drawings, and that in actual practice, the parts so described may have entirely different direction, relative position, and the like. Examples of such words are "vertical," "horizontal," "upper," "lower," etc.

A large variety of pressure and/or temperature regulators may be manufactured in an efficient and economical manner from a relatively few standard embodiments of the type of support frame 20, of this invention, which is shown in FIGURE 1. The length of frame 20 is sufficient to receive various standard components of this invention, including two bellows or diaphragm constructions to be more fully described. Such frame 20 may support various components to produce regulators of the type shown in FIGURES 10–15, 29, 31, and the like, which have two bellows or diaphragms.

However, the length of the frame 20 may be varied, and may be either longer or shorter than is shown in FIGURE 1. For example, the frame may be made shorter to accommodate standard components of this invention and to produce single bellows or diaphragm regulators, such as are shown in FIGURES 22–25, and the like.

Figure 2:
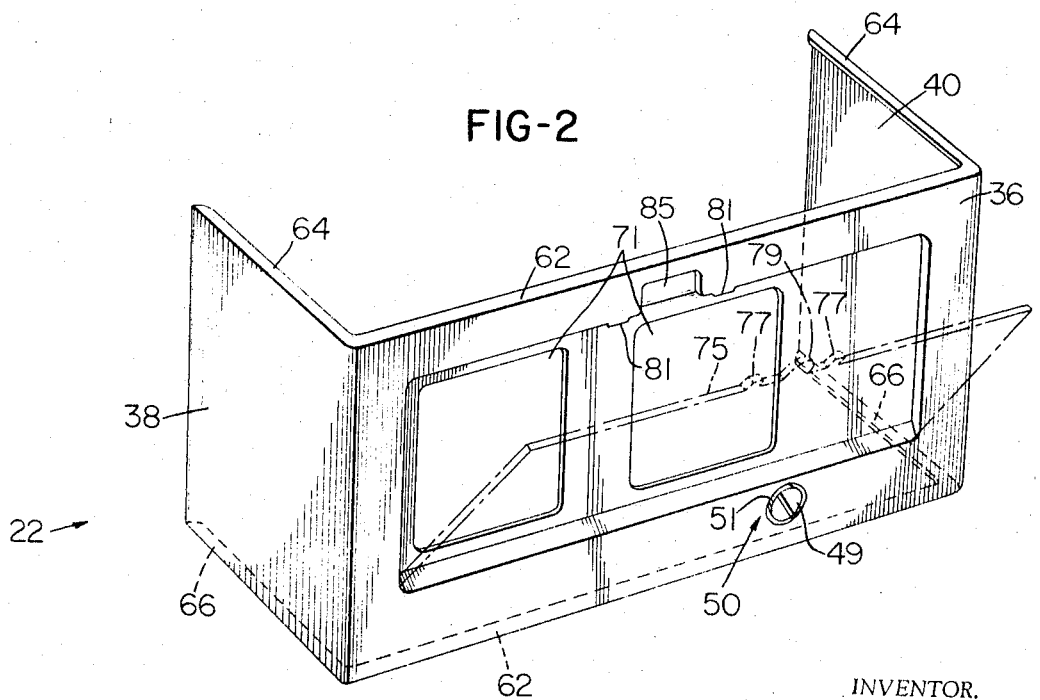
FIGURE 2 is a front perspective view of a cover to be applied to the frame of FIGURE 1 after the desired components have been assembled on the frame.

The frame 20 of FIGURE 1 may accept a cover 22, as shown in FIGURE 2, which may be telescoped with and secured to the frame 20 after the components of this invention have been assembled on or in the frame. This telescoping action of the frame and cover is indicated in FIGURES 4 and 5. Both the frame 20 and cover 22 may be made shorter or longer to produce regulators having more or less than the two bellows or diaphragms, as desired.

The frame 20 may be formed from a sheet metal blank 52, as shown in FIGURE 3. Such blank 52 is shown of a width to produce the frame of a length such as shown in FIGURE 1. However, the width of the blank 52 may be varied to produce frames of different lengths, such as are herein disclosed.

The frame 20 may have formed therein certain openings, indentations, flanges, bridges, and the like, such as are shown on the blank 52 of FIGURE 3. These openings, etc., are adapted to receive and/or support various components, such as elsewhere described. Substantially all of the openings, etc., may be formed on each type of frame and blank, and only selected ones of such openings, etc., need be used to receive and/or support the desired components to produce the type of tailored regulator required by any one refrigeration system manufacturer or user. Small or large quantities of any one such tailored may be efficiently and economically produced.

While one arrangement of openings, indentations, flanges, bridges, and the like has been illustrated, by way of example, it is to be understood that other arrangements of such openings, etc., may be used, as may be desired for various requirements of purchasers of the regulators.

The assembly of such components on the frame construction is more fully elsewhere described.

Many of the advantages of this invention may be used in connection with other frames or supports.

THE FRAME AND COVER

The frame of this invention may be a homogeneous, forwardly open channel shaped support frame 20 and a homogeneous rearwardly open removable channel shaped cover 22 telescoping with said support frame 20, to support and enclose the control means as elsewhere described.

The frame 20 may have a top frame wall 24, a bottom frame wall 26, and a rear frame wall 28, these walls providing a front frame opening 30, and two side frame openings 32 and 34.

The cover 22 may have a front cover wall 36 and two side cover walls 38 and 40, to close the frame openings 30, 32 and 34.

The front cover wall 36 may cover the front frame opening 30, and the side cover walls 38 and 40 may cover respectively the side frame openings 32 and 34. The cover 22 need not be used where the cover may not serve any useful purpose. The regulator is still functional without the cover.

Controller producing means, or components, as shown and described elsewhere in connection with other figures, may be supported by said support frame 20, as more fully elsewhere described.

One or more reinforcing brackets 42, 44 may be secured to the front portions or edges 46 and 48 of said top and bottom frame walls 24 and 26.

Securing means 50 may be provided for securing said cover 22 to said support frame 20. Such securing means may take the form of a screw 49 which threadedly secures the front cover wall 36 to the reinforcing bracket 42 or 44. Suitable indentations 51 are provided to receive the screw head in a countersunk manner. If desired, a split lock washer 53 may be provided between the threads of the screw and the indentation 51 on the front cover wall, to prevent loss and loosening of such screw.

The support frame 20 and the cover 22 may each be made homogeneous, i.e., of one piece construction. For example, the support frame 20 (and similarly the cover 22) may be made from a flat blank 52. Such blank may have substantially rectangular parts 24′, 26′ and 28′ which may be bent along the joining edges or lines 54′ and 56′ to form, respectively, the frame top wall 24, the frame bottom wall 26 and the frame rear wall 28. A pair of reinforcing flange forming wings 58′ may be provided on the blank 52 which may be bent to form the reinforcing flanges 58 on the side edges of the rear frame wall 28.

The top frame wall 24, the bottom frame wall 26 and the rear frame wall 28 may each be substantially rectangular. They may have united top and bottom rear frame edges 54 and 56 which are formed by bending the blank 52 at lines 54' and 56'. The frame walls may also form free top and bottom front frame edges 46 and 48 and top and bottom free side frame edges 60 and 61.

The front cover wall 36 has upper and lower rearward flanges 62 telescoping over said free top and bottom front frame edges 46 and 48. The two side cover walls 38 and 40 may each have top and bottom side flanges 64 and 66 respectively telescoping over said free top and bottom side frame edges 60.

The top and bottom free side frame edges 60 and 61, the two side cover walls 38 and 40 and the top and bottom side flanges 64 and 66 taper slightly together frontwardly to permit easy and effective telescoping action between said cover and said support frame. For example, if the top and bottom rear frame edges 54 and 56 are 5½ inches wide (excluding corner cutoffs), then the top and bottom front frame portions or edges 46 and 48 may be 5⅜ inches wide excluding the rounded cutoffs. The corresponding cover side walls 38 and 40 may be slightly more widely spaced at the rear edges 67 to telescope over the free side frame edges 60 and 61.

The reinforcing brackets 42 and 44 may be indicating brackets and may have indicating means or plates 68 and 70, FIGURE 10, with proper scales or indicia on said plates 68 and 70 to indicate a condition or conditions of the control means such as in pounds per square inch, gauge, and/or vacuum in inches of mercury column, as is well known.

The cover 22 may have windows 71. The windows 71 are for the purpose of inspection of the indicating brackets 42 and 44 inside the frame 20. A suitable door 75 may be used on the front cover wall 36 and may have integral tongues 77 and 79. The tongues 77 will snap under and catch in the downward tongues 81. The tongue 79 may enter the indentation 85 and may be used as a pull out lever for pulling the cover or door 75 outwardly when it is desired to open the door and inspect the settings of the switch controller.

The reinforcing brackets 42 and 44 may be vertical flat plates with backwardly directed top and bottom tongues 72 and 74 at the top and bottom edges of the reinforcing brackets or plates 42 and 44. The tongues 72 and 74 pass respectively over and under the bridges 76 and 78 which are press formed in the top and bottom frame walls 24, 24' and 26, 26'. The brackets 42 and 44 may then be held secured to the frame walls 24 and 26 by locking means such as the upset notches 80 in the walls 24 and 26 which engage the corners of the tongues 72 and 74.

The indicating plates 68 and 70 may be secured to the reinforcing brackets 42 and 44 by backwardly directed top and bottom attaching tongues 82 and 84 respectively which are respectively bent down and up behind the brackets 42 and 44 at suitably provided cut out places 86, 88 in the brackets 42 and 44.

Various openings and offsets may be formed on the blank 52 to receive various parts of the control means as is apparent from descriptions and illustrations of the various components as herein disclosed.

INTERCHANGEABLE AND VARIOUSLY MOUNTABLE PARTS

The frame 20 and cover 22 may be combined with a group of parts or components that are variously mountable within the frame 20 and cover 22 to produce controllers of many different characteristics. For example, it is possible to assemble as many as 400 to 500 different controllers from a relatively small number of interchangeable and variously mountable parts and frames.

REFRIGERATION CONTROL

The controller of this invention may be used as a refrigeration controller, for example. However, the controller of this invention is applicable for many other uses.

When used as a refrigeration controller, for example, such controller may be connected to various refrigeration systems to control such systems in many different ways.

Merely by way of example, the pressure controller of this invention may be assembled as a multiple pressure controller for connection with a typical refrigeration system, such as illustrated in FIGURE 9.

For example, a refrigerant compressor 90 may be driven by an electric motor 91. The compressor 90 discharges compressed refrigerant vapor to a refrigerant condenser 92 through a high pressure refrigerant conduit 93. The condenser 92 discharges high pressure refrigerant liquid through high pressure liquid refrigerant conduit 94 to a refrigerant pressure reducer or expansion device 95, such as an automatic refrigerant expansion valve. The pressure reducer 95 delivers low pressure liquid refrigerant through conduit 96 to the refrigerant evaporator 97 where the liquid refrigerant is evaporated. The evaporated refrigerant from the evaporator 97 is discharged through the low pressure refrigerant return line 98 to the compressor 90. Such refrigerant flow cycle is continuously repeated as long as the motor 95 operates and such cycle is stopped when the motor 91 stops.

A multiple pressure controller 99, assembled according to this invention, may have a high pressure diaphragm or bellows chamber 100 connected to any high side part of the refrigeration system, such as the conduit 93. Such chamber may be so connected by means of the high side connecting conduit 101. The controller 99 may also have a low pressure diaphragm or bellows chamber 102 connected to any part of the low side of the refrigeration system, such as the low pressure return line 98. Such connection may be made by means of the low pressure connecting line 103.

However, the controller of this invention may be assembled so the parts may be responsive to high and/or low temperatures produced by the refrigeration system and may be connected by temperature responsive bulbs and the like connected to the diaphragm chamber or chambers of such controller.

The switch 104 may have a snap action means 106, FIGURE 11, which is actuated by the action of the bellows or diaphragm chambers 101 and 102 to open and close the electric circuit between the lines L' and L" and the motor 91 to start and stop the refrigeration action in response to the pressures in the high and/or low sides of the refrigeration system.

Refrigerant systems may be controlled by the multiple bellows embodiments of this invention as shown in FIGURES 10–14, 29, 31 and 32, or by single bellows embodiments of this invention as shown in FIGURES 22A, 23–25.

The frame 20 may be modified as to length, breadth or thickness as desired for acceptance of the components to produce the embodiments herein disclosed by way of examples, or to produce many other embodiments, as is obvious from this disclosure.

GENERAL CONSTRUCTION OF THE CONTROLLER

The general nature of the controller will first be broadly described in connection with the embodiment of FIGURES 10–14.

The bottom frame wall 26 may be a generally flat horizontal frame wall and the rear frame wall 28 may be a generally flat vertical wall.

The switch or switch means 104 may have snap action means 106 having an "on" or "cut in" position and an "off" or "cut out" position. Such switch means may also have a gradually and snaplessly movable actuator means 108 which actuates the snap action means 106, to produce "on" and "off" snap actions at definite horizontal positions of the actuator means 108.

Fulcrum means 110 may be provided on the horizontal frame wall 26. One or more L-shaped rocker arms 112 and 112′ may each have a substantially horizontal arm lever 114, 114′ and a substantially vertical arm level 116, 116′ rigidly secured together and rockingly fulcrumed on the fulcrum means 110 on the horizontal frame wall 26.

Shuttle means 118 may be provided, which may have hinge means 120 reciprocably supporting the shuttle means 118 on the vertical frame wall. The shuttle means 118 may have adjustable abutting means 122 abutting said switch actuator means 108. Such shuttle means 118 may be horizontally gradually movable by the horizontal movement of the upper ends of the vertical arm levers 116 and 116′. The words "shuttle," "shuttle means" and/or "shuttle movement means," as herein used, are intended to define a member, device or flat sheet or plate such as 119, etc., that is "moved back and forth with a shuttle movement," as defined in Webster's International Dictionary, Unabridged, Copyright 1961, or "to and fro or back and forth as if by a shuttle" as defined by The Random House Dictionary, Unabridged, Copyright 1966 or "having a similar to and fro action" as defined by Webster's New World Dictionary, College Edition, Copyright 1957.

Adjustable lever-shuttle abutting means or longitudinally adjustable screws 124, 124′ may be provided on the vertical arm levers 116 and 116′ to engage the shuttle means 118 for reciprocating the shuttle means 118 on the hinge means 120.

Compression springs 126 and 126′ downwardly press the tops of the horizontal arm levers 114 and 114′.

Pressure responsive means 128 and 128′ have horizontal arm lever upward actuating means 129, 129′ pressing the under side of the horizontal arm levers 114 and 114′.

The negating spring 130 may be a bowed compression spring with its upper end 137 rocking at a stationary negating spring upper fulcrum 138 at the bottom of screw 135, FIGURE 40. Spring 130 also rocks on a laterally moving or oscillating fulcrum 232 which is at an upper part 230 of the vertical lever 116, such parts 232 and 230 being also shown in FIGURE 26. The negating spring fulcrums 138 and 232 form a negating spring fulcrum line 139, FIGURE 40. The negating spring fulcrum 138 and the arm fulcrum 110, FIGURE 11 form an negating arm fulcrum line 133, FIGURE 11. The lines 135 and 139, FIGURE 40 form an angle 141 which increases as the vertical lever 116 and the fulcrum 232 move rightwardly. The horizontal component or force of the downward spring load of negating spring 130 increases or decreases as the sine of the angle 141 increases or decreases at FIGURE 40.

Since the arm levers 116 and 114 are rigidly secured together, the downward force of the horizontal lever due to the spring 130 also correspondingly increases as the sine of the angle 141.

The negating spring 130 therefore serves the purpose of reducing the spring rate of the range spring 126 whereby a fixed on and off switch actuation is obtained with an operating force less than that which would be required without the negating spring. This accomplished by adding a diminishing force to the increasing force caused by range spring 126 and diaphragm 128 deflection obtained by an increase in sensing pressure and vice versa. The diminishing force is obtained by a decrease in the resultant force from a change in sine of the force angle 141. The negating spring fulcrum or adjustable screw 135 is provided at the upper end 137 of the negating spring 130. Adjustment of screw 135 determines the rate of the negating action of negating spring 130.

The fulcrum means 110 may include a pair of universally rockable arm supporting fulcrums 132 and 134, FIGURES 12, 15 and 16, on the horizontal frame wall 26. The rocker arm 112 has a pair of fulcrum rocking constructions or grooves 136, 136′ which engage the pair of rockable arm supporting fulcrums 132, 134. The fulcrum rocking constructions 136, 136′ may be in the form of a pair of groves near the joint construction 140 between the arm levers 116 and 114 of the rocker arm 112.

The shuttle means 118 may include a horizontally edgewise movable vertical shuttle plate 119, FIGURE 22. That is, the shuttle movement means 118 may include a vertical flat plate 119, FIGURE 22, movable horizontally gradually and snaplessly in a vertical plane, and actuating said movable actuator means 108 which actuates said snap action means 106, FIGURE 11. The shuttle hinge means 120, FIGURES 13 and 14, may include a plurality of C-shaped hinges 121, each hinge having a web foot 142 attached to the vertical frame wall 28 and another web foot 144 attached to the shuttle means 118 or plate 119.

The control apparatus of this invention may be adapted to be responsive to two different pressures, or temperatures, produced by the refrigerating system. For example, two L-shaped rocker arms 112, 112′ may each be rockingly fulcrumed in two different fulcrum means 110, 110′ on the horizontal frame wall 26. Each of these rocker arms may each have a respective vertical arm lever 116 and 116′ separately abutting the shuttle means 118 through the medium of adjustable screws 124, 124′, FIGURES 11 and 14. Each respective horizontal arm lever 114, and 114′ may be downwardly pressed by a separate compression spring 126, 126′ each downwardly pressing the top of a respective horizontal arm lever 114, and 114′. A separate pressure responsive means, diaphragm or bellows 128, 128′ may have lever actuating means or buttons 129, 129′ engaging the under side of a respective horizontal arm levers 114, and 114′.

The respective vertical arm levers 116 and 116′ may engage the single horizontally edgewise movable vertical shuttle plate 119 by adjustable means or screws 124, 124′, FIGURES 11 and 14.

The single shuttle construction 118, FIGURE 11, 14 and 22 has a flange 172, with a hole 174, which receives the screw 122. The shuttle 119 also has a flange 176 which is actuated by the screw 124, and a flange 178 which is engaged by the screw 124′. The shuttle 119 also has a flange 180 for operation by a vertical arm member 112 (148) through screw 216 as shown in FIGURE 31. Suitable reinforcing rib constructions 181 may be provided.

However, the corresponding vertical levers 148, 148′, FIGURES 29 and 30, may engage two separate small shuttle plates 146, 146′. Each of the two small separate respective edgewise movable vertical shuttle plates 146, 146′ may each be abutted by separate respective vertical arm levers 148, 148′, which have abutting screws 150 and 150′ each respectively abutting flanges 154 and 155 of the respective separate shuttle plates 146 and 146′. In the embodiment shown in FIGURE 29, the vertical lever arms 148, and 148′ may be substantially the same as arms 116, 116′, that are described in connection with FIGURES 10–14.

The small shuttle plate 146′ may have an abutting tongue 152, which abuts or engages the flange 154 on the shuttle plate 146. Each of the small shuttle plates 146 and 146′ may have spring hinges 156 substantially similar to the hinges 121 previously described in connection with the single shuttle plate 119, FIGURES 11 and 14. However, three separate hinges 156 may be provided for each of the small shuttle plates 146 and 146′, of FIGURES 29 and 30.

The small shuttle 146, FIGURES 29 and 30, has an end flange 158, which receives the screw 160 in the hole 162. The screw 160 engages the actuator 108 of the switch means 104, which may be similar to the switch means 104 previously described in connection with FIGURES 10–14.

The low pressure bellows construction 164, FIGURE 29, actuates the horizontal arm lever 166. The fall in refrigerant pressure in the low pressure bellows chamber 164 causes a downward movement of lever 166 and rightward movement of vertical lever 148. This causes rightward movement of screw 150, small shuttle 146, screw 160, and gradually movable actuator means 108 to open the switch 104 in the same manner as is done in FIGURE 11. The high pressure refrigerant bellows construction 168 moves the horizontal arm lever 170 upward on upward rise of high side pressure, and this moves the vertical arm lever 148' rightwardly along with the screw 150', flange 155, to move the shuttle 146' rightwardly along with the tongue 152. The tongue 152 moves the flange 154, shuttle 146, flange 158, and screw 160, to move the actuator 108 rightwardly and to open the switch 104, upon the upward production of cut out pressure of the high side of the refrigerant system.

A negating spring 130A may be provided and have the same action as the spring 130 of FIGURES 11 and 14. Another negating spring 130B engages the lever 148' and can negate the compression spring for the horizontal arm 170, if desired.

SHORTER FRAMES

Shorter frames 20A, FIGURES 22A, 23 and 24 and FIGURE 25 may be provided when it is desired to produce a regulator with only one bellows 182, FIGURES 22A, 23 and 24, which may be a high side bellows or one bellows 184 in FIGURE 25, which may be a low side bellows. Shorter covers, not shown, may be provided for the frames 22A. Such shorter covers may correspond to cover 22 FIGURE 2.

In FIGURES 22A, 23 and 24, the high side bellows 182 may operate on horizontal lever 183 of the arm construction 186, which has a vertical lever 188, with a screw 190 for operating a reversing lever 192, which is pivoted on the pin 194. When the high side bellows 182 is pressurized to the selected cut out pressure, the lever 188 moves the screw 190 leftward and rotates the lever 192 clockwise, so that the upper end of the lever 196 engages the rounded end 198 of a single small shuttle 146A, which may be identical to small shuttle 146, FIGURE 30. The shuttle 146A can actuate the switch 104 in the same manner that the shuttle 146 actuates the switch 104 in FIGURE 29. Opening of the switch 104 stops the refrigeration, when the high side bellows reaches the predetermined high side cut out pressure as decided by the setting of the compression spring for the bellows chamber 182.

In the low side construction of FIGURE 25, the low side bellows 184 cuts out the switch 104 upon the fall in pressure in the low side bellows chamber 184 at the selected cut out low pressure. This occurs when the horizontal lever 200 causes the vertical lever 202 to move rightwardly and move the screw 204 against the flange 154 of a small shuttle 146, of the character shown in FIGURE 30, which causes the flange 158 and screw 160 to actuate the actuator 108 and open the switch 104, when the bellows pressure in bellows chamber 184 falls to the cut out point. If desired, a negating spring 130 may be provided for negating the action exactly in the same manner as is done in FIGURES 10-14.

In FIGURE 31, a low side bellows 208 may be provided in a double bellows frame of the character of FIGURES 10-14. The other bellows of such frame construction may be a high side bellows with the arm construction mounted to move the shuttle 146 rightwardly upon rise in high side pressure. The low side bellows 208 may actuate a rocker arm 210, which may be fulcrumed at 212 and may have a vertical lever 214, which carries an actuating screw 216. The screw 216 may actuate a flange 218 of a small shuttle plate 146' (see FIGURE 30) which has a tongue 152 for actuating a flange 154 of a small shuttle 146, which is actuated by a high side bellows construction, if desired. A negating spring 130 may be provided which acts on the lever 214 in the same manner as has been described in connection with FIGURES 10-14 where the negating spring 130 acts on the low side lever 116 in the same manner that the negating spring 130 of FIGURE 31 acts on the lever 214.

The advantage of the construction of FIGURE 31 is that some refrigeration manufacturer may be provided with a controller that is sensitive to refrigeration conditions in an entirely different manner from that described in connection wih FIGURES 10-14.

In FIGURE 32 an arm 220 may be actuated by a bellows construction 222, which may be mounted on the upper wall of the frame construction. The bellows 222 may have a push rod 224 which passes through an opening in the top wall 24 and engages the horizontal arm lever 225 which does not carry a compression spring or compressing spring receiver. A compression spring or bellows may push the lever 225 upwardly, if desired. The lower end of the rod 224 may engage the opening 266 of arm lever 114 of FIGURES 21 and 23.

The diaphragm 222 may be responsive to the oil pressure or the like in the refrigeration system and is adapted to stop operation of such refrigeration system when the oil pressure is unsafe, i.e., too low, too high, too hot, etc. The shuttle is to be moved rightwardly when the unsafe pressure is produced.

Thearm 227 may be operated by a high side or low side bellows to remove the shuttle rightward upon rise in high side refrigerant pressure or upon fall in low side refrigerant pressure.

FEATURES OF ROCKER ARM

The rocker arm 112, or rocker arm construction, is shown in perspective in FIGURE 21, in top view in FIGURE 33, and in side view in FIGURE 36. This rocker arm construction may be used in all of the embodiments herein disclosed. It may be formed from a single blank by bending processes, as is obvious from FIGURE 21. It has a horizontal arm lever 114, a vertical arm lever 116, and has an elbow joint construction 140, homogeneously joining the horizontal arm lever 114, and the vertical arm lever 116. A pair of side braces 223 are integral or homogeneous with the vertical arm lever 116 and are rigidly secured to the horizontal arm lever 114 by means of the tongues 226 which are staked or welded securely in the notches 228 in the side braces 224.

The upper end of the vertical lever 116, FIGURE 21 has openings 233 for the selective reception of screws 235 which may be any of the screws shown to engage any of the shuttle members and the like in all of the embodiments.

The vertical arm 116 has a slanting channel 230, the top end 232 of which is adapted to be the lower fulcrum point for the negating spring 130, in FIGURE 26. The top end 232 is properly rounded or otherwise finished properly to rock the lower end of the negating spring 130.

The horizontal lever 114, FIGURES 21 and 33, has a downwardly slanting tongue 234 which is formed between the slits 236. The tongue 234 interlocks with a fulcrum hook 238, FIGURE 18, which is formed in the bottom wall 26 of the frame 20 at the proper place properly to locate the arm 112. The fulcrum hook 238 engages the upward channel 240 in the tongue 234, so that the horizontal lever 114 can fulcrum or pivot about the hook 238. A pair of small lugs or ears 242, FIGURES 21 and 18, engage the sides of the fulcrum hook 238, and prevent sidewise movement of the arm 112, as it rocks about the hook 238.

The horizontal lever 114 has a raised platform 244, FIGURES 18 and 21, in which a rocker groove 246 is formed to receive a downward rocker lip 248 of a spring end receiver 250 to be more fully described. The groove 246 is gently stroked in its central part, FIGURES 21, 33–35, and has relatively sharp bottomed fulcrum ditches 252 which receive the downward lip 248, to transfer a relatively sharp equally distant spring stress on the arm 114.

The spring end receiver 250, FIGURES 19-20, may have a relatively flat plate 254 which receives the lower end of the compression spring 126, or any other compression spring herein disclosed. The plate 254 has two upper flanges 256 cut and bent upwardly from the plate 254. A third flange 258 is part of a single homogeneous zigzag piece which passes through a notch 260, FIGURE 18, and has a horizontal part 262 firmly held against the bottom of the plate 254. The end of the part 262 is bent downwardly to form the lip 248, the lip 248 being cut or ground to a thin blade, more sharply to rock against the fulcrum ditches 252. The lower end of the compression spring end 126 encircles the three flanges 256 and 258 and is prevented from moving sidewise on the plate 254. A downward tongue 264 is cut and pressed in the plate 254 and passes through an opening which is located in the horizontal part 262 and such tongue 264 is then staked as shown in FIGURE 18 firmly to hold the parts 258, 262 and 248 against the plate 254. Any other suitable means of securing the parts 258, 262 and 248 to the plate 254 may be used, such as by welding, and the like.

The rocker groove 246 has an opening 266, in which the actuating means 129 of any of the bellows or diaphragm constructions may engage the horizontal lever 114. For this purpose, the actuator means 129 may be provided with a nipple 268 to engage the opening 266.

A pair of openings 270, FIGURE 21, may be formed in the side braces 223, and inwardly directed bridges 272 may be struck inwardly in each of the braces 224.

The close form of the ends of the recess 246, FIGURE 21, with the tab or downward lip 248, FIGURE 19, prevents sidewise movement. Bridge 272, FIGURE 21, has a limiting feature to prevent plate 254, FIGURE 19, from raising out of the recess 246 when range settings are reduced beyond their designed limits.

The end of the horizontal lever 114 may have a notch 274, FIGURE 21, to permit a rod 276, FIGURES 11 and 14, to pass upwardly from the opening 278, FIGURE 14, such rod extending upwardly through the controller of FIGURE 14 and loosely through opening 279 in top wall 24. The upper end of rod 276 may have a screw driver slot, which may be encased in a square cross-sectioned adapter 281, for turning by a wrench. The rod 276 may be surrounded by a differential spring 280 which engages an upper threaded washer 282 and a lower loosely encircling washer 284. This washer 282 has a pointer construction 286, FIGURE 10, to indicate the differential setting on the indicator 68. This construction is further described elsewhere.

The rocker arm construction 112 is pivoted on a pair of universally rockable fulcrum members 132 and/or 134 which are shown in FIGURES 15 and 16. Either of these members includes a circular disc 288 which has an upward sharp knife edge fulcrum member 290 which engages the groove 136 in the horizontal lever 114. The disc 288 also has a downward circular button 292, which is closely held in the opening 294 in the bottom frame wall 26.

The bottom frame wall 26 is provided with oppositely directed ridges 296, FIGURES 15, 16 and 21, on which the discs 288 rock. In this manner, the fulcrum members 132 or 134 can rock on the ridges 296, and the arm levers 114 can rock universally at right angles to the ridges 296 on the knife edges 294. This universal rocking action prevents any undue wear by maintaining line contact through the reciprocating rotational operation of arm lever 114.

The negating spring 130, FIGURES 26–28, has its lower end against the upper end 232 of the channel 230 of the vertical arm lever 116. The upper end of the channel 230 may be provided with a rounded rocking surface or knife edge surface, such end 232 being rounded sufficiently to permit the lower end 131 of the negating spring 130 to rock easily and accurately thereon.

The upper end 137 of the negating spring 130 has a universal fulcrum action, which is more fully shown in FIGURES 27 and 28. The screw 135 may be screw threaded in the top wall 24 of the support frame, as shown in FIGURES 10, 11 and 14. The upper end of the screw 135 may be provided with a screw driver receiving slot 298, FIGURE 10. This portion of the screw driver slot 298 can be broken off after the screw 135 has been properly calibrated, if desired. A suitable lock nut 300 may be provided to maintain the screw 135 in calibrated position.

The upper end of the negating spring 130, at 137, FIGURE 26, is provided with a universal rocking groove, FIGURES 27 and 28, which is formed by two portions of horizontal cones 304 and 306, the apexes of which cones are generated at 308 and 310, FIGURE 27. The lower end of the screw 135 may be rounded to form a part of a sphere 312, the sphere being indicated as extended around at 314, and having a center at 316. By this construction the upper end 137 of the negating spring 130 can rock universally in any direction about the spherical end 312 of the screw 135 without imparting any objectionable dimensional shaft which can cause a force change that will shift the range and differential settings. The intersection of the two conical surfaces 304 and 306 provide a space where common end imperfections on screw 135 do not become effective in rolling action between the two components.

The springs 120 have web feet 142 and 144. The web foot 142 is secured to the rear wall 28 by a rivet 318 which extends through a hole 320 in the web 142 and a hole 322 in the rear wall 28 and has a rivet upset 324 against the wall 28. A short pin 326 extends from the wall 28 and engages the notch 328 in the web 142.

The web 144 is riveted to the shuttle 119 by a similar rivet 318 passing through similar holes 320 and 322 and terminating in the rivet upset 324. However, a tongue 329 on the web 144 is bent down into a hole 327 in the shuttle plate 119.

The web feet 142 and 144 are therefore securely fastened to the wall 28 and shuttle plate 119 and are prevented from turning when the shuttle reciprocates. All of the springs 120 are similarly fastened to the rear wall 28 and the respective shuttle plates 146, 146' etc.

A reset member or flat plunger 330, FIGURE 37, may pass through an opening 332 in the top wall 24 of the frame 20A of FIGURES 22A, 23 and 24 or similar openings in the various top walls wherever a reset plunger is desired. This reset plunger also passes behind the reset channel 334 in the shuttle 146A (also shown in corresponding shuttle 146 in FIGURE 30). Similar reset channels 334 in any of the other shuttles 146', FIGURE 30, 119, FIGURE 22, wherever it is desired to provide a reset plunger. The lower end of plunger 330 is loosely held by rivet 331 which passes through opening 333 into rear wall 28.

Each shuttle has a small backward reset holding flange 336, FIGURES 22 and 30, aligned with the respective reset channel 334 which is engaged by the slanting edge 338 of the opening 340 of the reset plunger. The slanting edge 338 locks the shuttle in its rightward position with the switch 104 locked in open position. The opening 340 also has a horizontal edge 342 upon which the reset flange 336 may ride, when the reset plunger 330 has been pushed down to reset the switch, as has been done in FIGURE 23.

FIGURES 22A, 23 and 24 show a single bellows, high side controller which is adapted to stop operation of the refrigerating system if the high side pressure reaches an abnormally high pressure such as 300 p.s.i. The switch 104' is placed in series with the switch 104 of FIGURE 9. Under such conditions the high side pressure causes the bellows in chamber 182 to open the switch 104' and stop operation of motor 91. This is done as shown in FIGURE 24 where the vertical lever 188 has been moved leftward, the shuttle 146 has been moved rightward and the switch 104 has been opened. If the reset plunger 330 is pushed down from the position of FIGURE 24 to the position of FIGURE 23 when the pressure in the high side bellows chamber 182 has fallen below the abnormally high setting of the compression spring 126A, the shuttle 146A can, inherently by the bias of springs 120, spring leftward and allow the switch actuating member 108 to move leftward and close the switch 104'. This allows the motor 91, FIGURE 9, to operate the refrigerating system, unless the switch 104 of FIGURE 9 which has been placed in series with the switch 104' of FIGURE 29, maintains the power supply to the motor 91 open. The switch 104' is opened only if an unsafe high side pressure occurs.

The switch of FIGURES 22A, 23 and 24 may be a switch that is added to the circuit of FIGURE 9 with the switch 104' of FIGURES 22A, 23 and 24 in series with the switch 104 of FIGURE 9.

If the high side pressure of the refrigerating system should become unduly high, the pressure in the bellows of chamber 182, FIGURES 22A, 23 and 24, will move the vertical lever 188 leftwardly as shown in FIGURE 24. The reversing lever 192 will move the shuttle 146A rightwardly and will push the switch actuator 108 rightwardly to open the switch 104' and stop the refrigeration motor 91. At the same time this will also release the reset plunger 330 to move upwardly and lock the switch 104' in open position until the pressure on the high side falls to a safe limit and the reset plunger is again pushed down to the position of FIGURE 23.

The reset plunger 330 moves upwardly in FIGURE 24 because it is pulled up by the tension spring 344 which is secured to the opening 346 and to an opening 348 which is diagrammatically indicated in FIGURES 23 and 24. For example, such opening is also indicated in FIGURES 3 and 8 as made by a bridge 350 formed in the rear wall 28' which forms the opening 348 to which the spring 344 may be hooked.

The reset plunger 330 was released for upward movement by spring 344 in FIGURE 24 when the reset flange 336 was moved rightwardly beyond the horizontal edge 342. This allowed such edge 342 to move upwardly from the position shown in FIGURE 23 where the edge 342 and the reset plunger 330 were held down by the reset flange 336 when the shuttle 146A was in the normal operating leftward position.

A normal operation of the abnormal high pressure lock out controller of FIGURES 22A, 23 and 24 includes placing such controller in the electric circuit which supplies the power element such as the motor 91 of FIGURE 9. The switch 104' is placed in series with the switch 104 of FIGURE 9. The reset plunger 330 is pushed down to permit the shuttle 146A to move leftward to the position of FIGURE 23, with switch 104' closed. The controller remains in the position of FIGURE 23 as long as the refrigeration system operates with normal high side pressures below the safe limit as selected by the setting of the compression spring 126A, FIGURE 23. The closed switch 104' does not interfere with the normal operation and control of the refrigeration system. It is only when an abnormal or unsafe high side pressure occurs, that the switch 104' is opened, as in FIGURE 24 that the motor 91 of the refrigeration system is stopped. It is then necessary to reset the plunger 330, as in FIGURE 23 to restart the system.

Such reset control is applicable to other embodiments of this invention. The compression spring 126 of the embodiments of this invention may have their upper ends adjusted to regulate their spring load on the horizontal arm levers 114, 114', etc. Also the upper end of the differential springs 280 may be adjusted.

For example, in FIGURES 10-14, the reinforcing brackets 42 and 44 may be identical. Each bracket may have a vertical slot 352 which extends down behind the indicating plates 68 and 70.

Compression spring adjusting screws 354 may have a washer 356 and a rectangularly cross-sectioned manipulator 358 secured thereto by soldering and the like. The washer 356 upwardly engages the top wall 24 and the manipulator 358 passes through the opening 360. The manipulator may be turned by a wrench and also by a screw driver which may be inserted in the slot 362.

The upper end of the compression springs 126, 126' may engage a threaded vertically adjustable plate 364 which has a forward flat fork 366 which has prongs 368 and 370. The prong 370 extends into the slot 352, and prevents the plate 364 from turning. The prong 368 has a downward extension 372 to which the indicator carrier 374 is attached. The carrier 374 has flanges 376 with tongues 378 which are wrapped around the downward extension 372 and are secured thereto by soldering or the like. The carrier 374 has an indicating pointer 380 which indicates the pressure limit to which the compression spring 126 or 126' is adjusted.

The same type of adjustment is provided for both compression springs 126 and 126'.

A differential compression spring may also have an upper threaded adjusting washer or plate 282 which has an indicating pointer 286 which extends forwardly through a second vertical slot 382 in the reinforcing bracket 42.

The washed or plate 282 has a forked extension 384 which straddles the flange 386 and prevents the plate 282 from turning. The washer 282 also has a threaded engagement with adjusting screw 276.

A downward extension 388 from plate 282 is secured to a pointer carrier 390 similar to carrier 374 previously described.

The plate 282 has an arm 392 which has a fork 394 at one end around the threaded rod 276 and has the fork 384 at the other end to prevent the plate 282 and arm 392 from turning as they are being vertically adjusted by the rod or screw 276.

The screw has a sleeve 396 bolted in place. This limits the upward adjustment of the differential spring.

The snap action means 106 which is diagrammatically shown in FIGURE 11 is intended to be emblematic of any well known snap action switch with a gradually movable actuator 108. The actual switch may have any number of poles, connections, etc., which may be desired to control the refrigerating system and the like.

As diagrammatically indicated, the actuator 108 may be a leftwardly braced blade. A blade 400 is connected to the portion of the L' line leading to the motor 91 and may be leftwardly braced by compression spring 402 which engages an insulative plunger 404. A snap C-spring 406 engages a fixed fulcrum 408 at one end and an inner blade edge 410 at the other end in a slot 412 in blade 400. The movable contact 414 is snapped to and from the fixed contact 416 which is connected to L'. All of these parts are electrically insulated by base 418.

The L" line from motor 91 need not pass through the switch construction 104, FIGURE 9, if such line L" is not to be opened and closed by such switch construction 104. However, it can pass through the switch construction as illustrated in FIGURE 9 for convenience in attaching double line cables, and the like. The line L" must pass through the switch construction 104 of FIGURE 9 if the line L" is to be opened and closed by a double pole switch, and the like. Double pole snap switches are well known and can be substituted for the single pole snap switch 106 diagrammatically illustrated in FIGURE 11. Such double pole switch will simultaneously open both lines L' and L" which control the motor 91 of FIGURE 9.

The opening 422 of FIGURE 1 may be press flanged, as shown at 424 in FIGURES 10 and 14 through which the electrical lines or cables may pass to be connected to the terminal connectors 426 of switch 104, to incorporate the switch 104 into the electric control circuit, such as the electric circuit of FIGURE 9.

The fluid pressure connectors 428 illustrated at the bottom of the various figures may be connected to suitable bellows or diaphragms in the various chambers 164, 168, 182, 184, etc., such as the bellows or diaphragms 128, 128' partially illustrated in FIGURE 11. Such bellows or diaphragms may have buttons or the like, such as buttons 129, 129' of FIGURE 11 to press upwardly on the under sides of the respective rocker arms, as illustrated in FIGURES 17 and 18, where the buttons are shown engaging the under sides of the horizontal arm levers 114.

The channels 334 of the shuttles 119, 146, and 146', FIGURES 22 and 30 are sufficiently wide and deep to allow the shuttles to reciprocate horizontally without engaging or interfering with the reset plunger 330 of FIGURES 10–14, 22A–24, 37, etc.

The action of the differential spring 280 is apparent from FIGURES 10–14, 38 and 39 as follows:

Washer 284, FIGURE 14, is shown resting on the horizontal lever 114 at the same time resting on a shoulder on differential adjusting screw 276, which is shown at 277 in FIGURE 39 at the top of thicker part 279. Through adjustment of screw 124 against abutment 176, the position mentioned will cause a pickup of washer 284 by the adjacent portion of lever 114, as shown in FIGURE 39, before the higher pressure trip position is reached. A reduction of pressure will lower the lever 114 with the washer 284 resting thereon until it has again been deposited on the respective shoulder 277 on differential adjusting screw 276. A continued reduction of pressure will cause lever 114 to separate from washer 284, as shown in FIGURE 38, before the low pressure trip position of the switch has been reached. It is thus any differential adjustment will affect the high pressure trip point only. This will thus only affect changes in the higher pressure switch trip point.

The foregoing descriptions and the illustrations in the drawings are intended to disclose only a few of the large number of embodiment of controllers and the like which may be assembled from the relatively few frame supports and components that embody and come under the purview of this invention.

While the form of the invention now preferred has been disclosed as required by statute, other forms may be used, all coming within the scope of the claimed subject matter which follows.

What is claimed is:

1. A control apparatus comprising: a support frame having a generally flat horizontal frame wall, and a generally flat vertical frame wall; a switch means supported by said support frame, said switch means having snap action means with on and off positions, said switch means having gradually and snaplessly movable actuator means actuating said snap action means to said on and off positions; fulcrum means on said horizontal frame wall; an L-shaped rocker arm having a substantially horizontal arm lever and a substantially vertical arm lever rigidly secured together and rockingly fulcrumed on said fulcrum means on said horizontal frame wall; shuttle movement means having a plurality of hinge means reciprocably supporting said shuttle movement means on said vertical frame wall, said shuttle movement means having adjustable abutting means abutting said switch actuator means; adjustable lever-shuttle movement abutting means between said vertical arm lever and said shuttle movement means gradually and snaplessly reciprocating said shuttle movement means on said plurality of hinge means; a compression spring downwardly pressing the top of said horizontal arm lever; and a pressure responsive means carried by said horizontal frame wall and having horizontal arm lever upward actuating means upwardly pressing the under side of said horizontal arm lever.

2. A control apparatus according to claim 1 in which a negating spring appropriately engages said vertical arm lever and decreases the actuating force required to produce a reciprocating action of the shuttle movement means during the snap action of said switch means past said on and off position.

3. A control apparatus according to claim 1 in which said fulcrum means on said horizontal frame wall includes a pair of universally rockable arm supporting fulcrums, and in which said rocker arm has a pair of fulcrum rocking constructions engaging said pair of rockable arm supporting fulcrums.

4. A control apparatus according to claim 1 in which said shuttle movement means includes a shuttle movement vertical flat plate movable horizontally gradually and snaplessly in a vertical plane and actuating said movable actuator means which actuates said snap action means.

5. A control apparatus comprising: a support frame having a generally flat horizontal frame wall, and a generally flta vertical frame wall; a switch means supported by said support frame, said switch means having snap action means with on and off positions, said switch means having gradually and snaplessly movable actuator means actutaing sand snap action means to said on and off positions; fulcrum means on said horizontal frame wall; an L-shaped rocker arm having a substantially horizontal arm lever and a substantially vertical arm lever rigidly secured together and rockingly fulcrumed on said fulcrum means on said horizontal frame wall; shuttle movement means having a plurality of hinge means reciprocably supporting said shuttle movement means on said vertical frame wall, said shuttle movement means having adjustable abutting means abutting said switch actuator means; adjustable lever-shuttle movement abutting means between said vertical arm lever and said shuttle movement means gradually and snaplessly reciprocating said shuttle movement means on said plurality of hinge means; a compression spring downwardly pressing the top of said horizontal arm lever; and a pressure responsive means carried by said horizontal frame wall and having horizontal arm lever upward actuating means upwardly pressing the under side of said horizontal arm lever, and in which said shuttle movement means includes a shuttle movement vertical flat plate movable horizontally and snaplessly in a vertical plane and actuating said movable actuator means which actuates said snap action means, and in which said plurality of hinge means includes a plurality of C-shaped hinges, each hinge having a web foot attached to said vertical frame wall and another web foot attached to said movable vertical flat plate.

6. A control apparatus comprising: a support frame having a generally flat horizontal frame wall, and a generally flat vertical frame wall; a switch means supported by said support frame, said switch means having snap action means with on and off positions, said switch means having gradually and snaplessly movable actuator means actuating said snap action means to said on and off positions; fulcrum means on said horizontal frame wall; an L-shaped rocker arm having a substantially horizontal arm lever and a substantially vertical arm lever rigidly secured together and rockingly fulcrumed on said fulcrum means on said horizontal frame wall; shuttle movement means having a plurality of hinge means reciprocably supporting said shuttle movement means on said vertical frame wall, said shuttle movement means having adjustable abutting means abutting said switch actuator means; adjustable lever-shuttle movement abutting means between said vertical arm lever and said shuttle movement means gradually and snaplessly reciprocating said shuttle movement means on said plurality of hinge means; a compression spring downwardly pressing the top of said horizontal arm lever; and a pressure responsive means carried by said horizontal frame wall and having horizontal arm lever upward actuating means upwardly pressing the under side of said horizontal arm lever, and in which said plurality of hinge means includes a plurality of C-shaped hinges, each hinge having a web foot attached to said vertical frame wall and another web foot attached to said shuttle means.

7. A control apparatus according to claim 1 in which said abutting means of said shuttle movement means includes a longitudinally adjustable screw abutting said switch means actuator means.

8. A control apparatus according to claim 1 in which said lever-shuttle movement abutting means includes a longitudinally adjustable screw causing said vertical arm lever to reciprocate said shuttle movement means.

9. A control apparatus comprising: a support frame having a generally flat horizontal frame wall, and a generally flat vertical frame wall; a switch means supported by said support frame, said switch means having snap action means with on and off positions, said switch means having gradually and snaplessly movable actuator means actuating said snap action means to said on and off positions; fulcrum means on said horizontal frame wall; an L-shaped rocker arm lever having a substantially horizontal arm lever and a substantially vertical arm lever rigidly secured together and rockingly fulcrumed on said fulcrum means on said horizontal frame wall; shuttle movement means having a plurality of hinge means reciprocably supporting said shuttle movement means on said vertical frame wall, said shuttle movement means having adjustable abutting means abutting said switch actuator means; adjustable lever-shuttle movement abutting means between said vertical arm lever and said shuttle movement means gradually and snapless reciprocating said shuttle movement means on said plurality of hinge means; a compression spring downwardly pressing the top of said horizontal arm lever; and a pressure responsive means carried by said horizontal frame wall and having horizontal arm lever upward actuating means upwardly pressing the under side of said horizontal arm lever, and in which two of said L-shaped rocker arms are each rockingly fulcrumed on fulcrum means on said horizontal frame wall, each L-shaped rocker arm having a respective vertical arm lever separately abutting said shuttle movement means and a respective horizontal arm lever with a separate compression spring downwardly pressing the top of said respective horizontal arm lever and a separate pressure responsive means upwardly pressing the under side of said respective horizontal arm lever.

10. A control apparatus according to claim 9 in which said shuttle movement means includes an edgewise movable vertical shuttle movement plate abutted by said respective vertical arm levers.

11. A control apparatus according to claim 9 in which said shuttle movement means includes two separate respective edgewise movable vertical shuttle movement plates each abutted by a separate respective vertical arm lever, said shuttle movement plates abutting each other and causing one of said plates to abut said gradually and snaplessly movable actuator means.

12. A control apparatus comprising: a support frame having a generally flat horizontal frame wall, and a generally flat vertical frame wall; a switch means supported by said support frame, said switch means having snap action means with on and off positions, said switch means having gradually and snaplessly movable actuator means actuating said snap action means to said on and off positions; fulcrum means on said horizontal frame wall; an L-shaped rocker arm having a substantially horizontal arm lever and a substantially vertical arm lever rigidly secured together and rockingly fulcrumed on said fulcrum means on said horizontal frame wall; shuttle movement means having a plurality of hinge means reciprocably supporting said shuttle movement means on said vertical frame wall, said shuttle movement means having adjustable abutting means abutting said switch actuator means; adjustable lever-shuttle movement abutting means between said vertical arm lever and said shuttle movement means gradually and snaplessly reciprocating said shuttle movement means on said plurality of hinge means; a compression spring downwardly pressing the top of said horizontal arm lever; and a pressure responsive means carried by said horizontal frame wall and having horizontal arm lever upward actuating means upwardly pressing the under side of said horizontal arm lever, and in which said horizontal frame wall and said vertical frame wall are part of a homogeneous forwardly open channel shaped support frame having a top frame wall, a bottom frame wall which is said horizontal frame wall, and a rear frame wall which is said vertical frame wall, and providing a front frame opening, and two side frame openings; a homogeneous, rearwardly open, removable channel shaped cover telescopes with said support frame, said cover having a front cover wall and two side cover walls, said front cover wall covering said front frame opening, and said side cover walls covering respectively said side frame openings; control means supported by said support frame; a reinforcing bracket secured to front portions of said top and bottom frame walls; and cover fastening means securing said cover to said support frame.

13. A control apparatus comprising a homogeneous, forwardly open channel shaped support frame having a top frame wall, a bottom frame wall, and rear frame wall, and providing a front frame opening, and two side frame openings; a homogeneous, rearwardly open, removable channel shaped cover telescoping with said support frame, said cover having a front cover wall and two side cover walls, said front cover wall covering said front frame opening, and said side cover walls covering respectively said side frame openings; control means supported by said support frame; a reinforcing bracket secured to front portions of said top and bottom frame walls; and cover fastening means securing said cover to said support frame.

14. A control apparatus comprising a homogeneous, forwardly open channel shaped support frame having a top frame wall, a bottom frame wall, and rear frame wall, and providing a front frame opening, and two side frame openings; a homogeneous, rearwardly open, removable channel shaped cover telescoping with said support frame, said cover having a front cover wall and two side cover walls, said front cover wall covering said front frame opening, and said side cover walls covering respectively said side frame openings, control means supported by said support frame; a reinforcing bracket secured to front portions of said top and bottom frame walls; and cover fastening means securing said cover to said support frame; and in which said top frame wall, said bottom frame wall and rear frame wall are each substantially rectangular and have homogeneously united top and bottom rear frame edges, free top and bottom front frame edges and free top and bottom side frame edges; said front cover wall has an upper and lower rearward flanges respectively telescoping over said free top and bottom front frame edges, and said two side cover walls each has top and bottom side flanges respectively telescoping over said free top and bottom side frame edges.

15. A control apparatus according to claim 14 in which said top and bottom free side frame edges, said two side cover walls and said top and bottom side flanges taper slightly together frontwardly to permit easy telescoping action between said cover and said support frame.

16. A control apparatus comprising a homogeneous, forwardly open channel shaped support frame having a top frame wall, a bottom frame wall, and rear frame wall, and providing a front frame opening, and two side frame openings; a homogeneous, rearwardly open, removable channel shaped cover telescoping with said support frame, said cover having a front cover wall and two side cover walls, said front cover wall covering said front frame opening, and said side cover walls covering respectively said side frame openings; control means supported by said support frame; a reinforcing bracket secured to front portions of said top and bottom frame walls; and cover fastening means securing said cover to said support frame, and in which said reinforcing bracket is an indicating bracket having indicating means to indicate a condition of said control means.

17. A control apparatus comprising a homogeneous, forwardly open channel shaped support frame having a top frame wall, a bottom frame wall, and rear frame wall, and providing a front frame opening, and two side frame openings; a homogeneous, rearwardly open, removable channel shaped cover telescoping with said support frame, said cover having a front cover wall and two side cover walls, said front cover wall covering said front frame opening, and said side cover walls covering respectively said side frame openings; control means supported by said support frame, a reinforcing bracket secured to front portions of said top and bottom frame walls; and cover fastening means securing said cover to said support frame, and in which said reinforcing bracket is a flat vertical plate with backwardly directed top and bottom tongues at the top and bottom edges of said plate and in which said top and bottom frame walls have front edges and inwardly directed bridges at said front edges which receive respectively said top and bottom tongues, and in which locking means are provided to lock said tongues in said bridges.

18. A control apparatus comprising a homogeneous, forwardly open channel shaped support frame having a top frame wall, a bottom frame wall, and rear frame wall, and providing a front frame opening, and two side frame openings; a homogeneous, rearwardly open, removable channel shaped cover telescoping with said support frame, said cover having a front cover wall and two side cover walls, said front cover wall covering said front frame opening, and said side cover walls covering respectively said side frame openings; control means supported by said support frame; a reinforcing bracket secured to front portions of said top and bottom frame walls; and cover fastening means securing said cover to said support frame, and in which said cover fastening means is a screw threadedly fastening said cover to said reinforcing bracket.

19. A control apparatus comprising a homogeneous, forwardly open channel shaped support frame having a top frame wall, a bottom frame wall, and rear frame wall, and providing a front frame opening, and two side frame openings; a homogeneous, rearwardly open, removable channel shaped cover telescoping with said support frame, said cover having a front cover wall and two side cover walls, said front cover wall covering said front frame opening, and said side cover walls covering respectively said side frame openings; control means supported by said support frame; a reinforcing bracket secured to front portions of said top and bottom frame walls; and cover fastening means securing said cover to said support frame, and in which said bottom frame wall is a generally flat horizontal frame wall and said rear frame wall is a generally flat vertical frame wall and including: a switch means supported by said support frame said switch means having snap action means with on and off positions, said switch means having gradually and snaplessly movable actuator means actuating said snap action means to said on and off positions; fulcrum means on said horizontal frame wall; an L-shaped rocker arm having a substantially horizontal arm lever and a substantially vertical arm lever rigidly secured together and rockingly fulcrumed on said fulcrum means on said horizontal frame wall; shuttle movement means having hinge means reciprocably supporting said shuttle movement means on said vertical frame wall, said shuttle movement means having adjustable abutting means abutting said switch actuator means; adjustable lever-shuttle movement abutting means between said vertical arm lever and said shuttle movement means reciprocating said shuttle movement means on said hinge means; a compression spring downwardly pressing the top of said horizontal arm lever; and a pressure responsive means carried by said horizontal frame wall and having horizontal arm lever upward actuating means upwardly pressing the under side of said horizontal arm lever.

20. A control apparatus comprising: a support frame; switch means supported by said support frame; switch actuating means to actuate said switch means to on and off position; fulcrum means on said support frame; L-shaped rocker arm means rockingly fulcrumed on said fulcrum means and having a substantially vertical arm lever and a substantially horizontal arm lever; shuttle movement means reciprocably supported on said support frame and having abutting means abutting said actuating means; shuttle movement abutting means on said vertical arm lever; downwardly pressing means downwardly pressing said horizontal arm lever; and upwardly pressing pressure responsive means carried by said support frame and upwardly pressing said horizontal arm lever.

21. A control apparatus according to claim 20 in which negating means negate the spring rate of the sum of downwardly and upwardly pressing means during actuation of said switch means to said on and off position.

22. A control apparatus according to claim 20 in which said fulcrum means and said rocker arm means have mutual universal rocking movement.

23. A control apparatus according to claim 20 in which said shuttle movement means includes an edgewise movable vertical shuttle movement plate.

24. A control apparatus according to claim 20 in which said shuttle movement means includes a plurality of edgewise movable vertical shuttle movement plates.

25. A control apparatus according to claim 20 in which negating means negates the rate of travel of said downwardly pressing means during actuation of said switch means to said on and off positions and in which said fulcrum means and said rocker arm means have mutual universal rocking movement and in which said shuttle movement means includes an edgewise movable vertical shuttle movement plate and in which said shuttle movement means includes a plurality of edgewise movable vertical shuttle movement plates.

References Cited
UNITED STATES PATENTS

| | | | |
|---|---|---|---|
| 2,578,340 | 12/1951 | De Lancey. | |
| 2,636,093 | 4/1953 | Clark et al. | |
| 2,824,919 | 2/1958 | Davis | 200—83.91 |
| 2,901,578 | 8/1959 | Noakes | 200—140 |
| 3,043,934 | 7/1962 | Bodenschatz | 200—133 |
| 3,339,118 | 8/1967 | Harner et al. | 317—114 |
| 2,682,590 | 6/1954 | Roberson | 337—327 |
| 3,299,199 | 1/1967 | Mattingly | 220—41 X |

BERNARD A. GILHEANY, *Primary Examiner.*

H. B. GILSON, *Assistant Examiner.*

U.S. Cl. X.R.

220—40, 3.94